Dec. 26, 1961   D. H. BRATTON   3,014,563
ANCHOR ASSEMBLY
Filed June 12, 1957

INVENTOR.
David H. Bratton
BY
L. D. Burch
ATTORNEY

United States Patent Office 3,014,563
Patented Dec. 26, 1961

3,014,563
ANCHOR ASSEMBLY
David H. Bratton, Birmingham, Mich., assignor to General Motors Corporation, Detroit, Mich., a corporation of Delaware
Filed June 12, 1957, Ser. No. 665,354
1 Claim. (Cl. 189—36)

The invention relates to an anchor assembly and more particularly to an assembly which resiliently anchors a member to a support. The anchor assembly may provide electrical insulation as well as vibration insulation. The assembly also may seal the support member aperture through which it extends. The resilient portion of the assembly is so constructed as to be retained in axial position during the tightening operation. When two members are to be secured together in spaced relation it is often desirable to provide an anchor associated with one of the members which may be readily placed in position and retained in its proper relation both before and during the tightening operation. Previous anchor assemblies employing resilient anchor bodies were designed to fit easily through the assembly receiving aperture in the support member. When the tightening operation was begun the resilient body tended to move axially until one end abutted a stop after which the resilient body was then expanded to form a bulb as the tightening operation continued. When this type anchor assembly is used to secure spaced members together, the sealing bulb often was formed between the two members rather than adjacent the outer side of the support member, thereby nullifying the sealing effectiveness of the assembly. Anchor assemblies embodying the invention are provided with an annular grommet type flange which prevents the axial movement of the assembly during the tightening operation, thereby insuring the proper bulb location.

Figure 1:
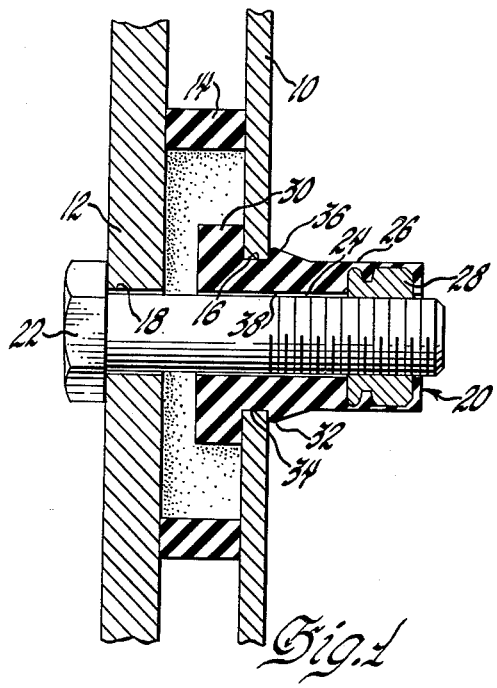
FIGURE 1 is a cross sectional view of an assembly embodying the invention before the tightening operation is begun.

The support member or plate 10 may have the plate 12 secured thereto in spaced relation by the assembly embodying the invention. The spacing is determined by a resilient body 14 which will keep the members 10 and 12 spaced apart to the desired distance and also act as a seal, the body 14 being shown in FIG. 1 in its free uncompressed condition and in FIG. 2 in its compressed condition. Member 10 may be provided with an aperture 16 and member 12 may be provided with an aperture 18 which may be axially aligned with aperture 16. Anchor nut assembly 20 is preferably received through aperture 16 and bolt 22 extends through aperture 18 and aperture 16 and into threaded engagement with a portion of anchor nut assembly 20.

Anchor nut assembly 20 may be provided with an axial passage 24 through which bolt 22 is received. The assembly includes a deformable resilient sleeve or cylinder 26 with a rigid internally threaded nut 28 integrally cast into or otherwise attached adjacent one end of the sleeve 26. A radially extending flange 30 may be integrally formed on the end of sleeve 26 opposite nut 28. Grommet flange 32 is preferably formed on the external surface of sleeve 26 intermediate nut 28 and flange 30. Flange 32 extends circumferentially about the sleeve 26. End flange 30 and grommet flange 32 cooperate to define a groove 34 into which support member 10 extends. The inner diameter of the groove 34 is preferably no greater than the diameter of aperture 16 and the outer diameters of flange 30 and grommet 32 are preferably greater in diameter than the diameter of aperture 16. Grommet 32 thus forms an abutment or land which is engageable with the outer surface of support member 10 surrounding aperture 16.

Assembly 20 is preferably so proportioned that sleeve 26 may be radially collapsed sufficiently to permit insertion into aperture 16. When bolt 22 is extended through the assembly beyond the plane of grommet 32, however, the assembly sleeve cannot be radially collapsed to such an extent that the assembly can be easily removed from the aperture.

When bolt 22 is threaded into nut 28 the nut tends to move to the left as shown in the drawing. Since grommet 32 abuts against the outer surface of support 10, the main body 26 of the assembly 20 cannot move to the left with the nut. A bulb or bulge 36 is therefore formed in the area of grommet 32, sealing the assembly against support member 10. The resilient sleeve 26 is also deformed internally at 38 to seal against the shank of bolt 22.

Figure 2:
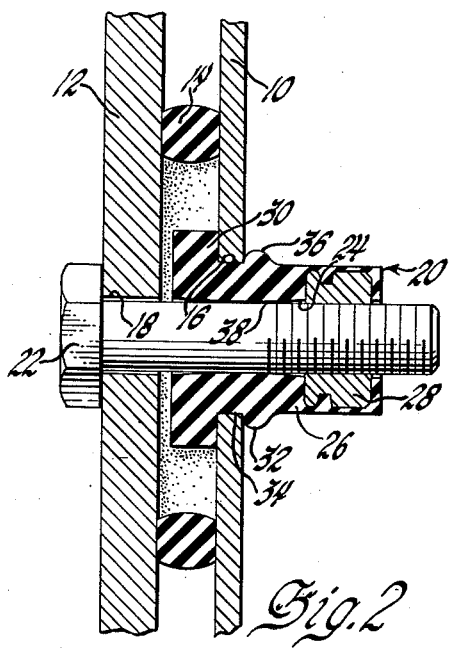
FIGURE 2 shows the assembly of FIGURE 1 with the tightening operation substantially completed.

As may be noted in FIGURE 2 of the drawing the anchor assembly 20 has not moved to the left into engaging relation with plate 12, but has remained in its proper position with respect to support member 10. An anchor assembly has thus been provided which is retained in its proper position at all times to insure adequate anchor strength and sealing action.

What is claimed is:

In combination, a first apertured member, an apertured support member in spaced relation thereto, a resilient spacer annulus freely positioned between adjacent surfaces of the members, an anchor assembly comprising a resilient sleeve member extending through the aperture of said support member, said sleeve member having an integral radially extending flange on one end, said flange being smaller in diameter and width than said spacer annulus, an internally threaded nut fixed at the other end of said sleeve member and in axial alignment therewith, a preformed annular abutment of smaller diameter than said flange integrally formed on said sleeve member adjacent said flange and axially spaced therefrom, said flange and said abutment defining a groove receiving said support member, and a headed bolt member passing through the aperture of said first member and said sleeve member with support member and threadably engaging said nut.

References Cited in the file of this patent
UNITED STATES PATENTS

| | | |
|---|---|---|
| 1,872,385 | Andren | Aug. 16, 1932 |
| 2,036,875 | Kraft | Apr. 7, 1936 |
| 2,088,358 | Adams | July 27, 1937 |
| 2,560,092 | De La Mater | July 10, 1951 |
| 2,605,588 | Lindstaedt | Aug. 5, 1952 |